(12) United States Patent
Li et al.

(10) Patent No.: US 11,360,928 B2
(45) Date of Patent: Jun. 14, 2022

(54) SYSTEMS AND METHODS FOR IMPROVED ANOMALY DETECTION IN ATTRIBUTED NETWORKS

(71) Applicants: Jundong Li, Tempe, AZ (US); Harsh Dani, Chandler, AZ (US); Xia Hu, Tempe, AZ (US); Huan Liu, Tempe, AZ (US)

(72) Inventors: Jundong Li, Tempe, AZ (US); Harsh Dani, Chandler, AZ (US); Xia Hu, Tempe, AZ (US); Huan Liu, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 0 days.

(21) Appl. No.: 16/550,937

(22) Filed: Aug. 26, 2019

(65) Prior Publication Data
US 2020/0065292 A1    Feb. 27, 2020

Related U.S. Application Data

(60) Provisional application No. 62/722,809, filed on Aug. 24, 2018.

(51) Int. Cl.
*G06F 15/173* (2006.01)
*H04L 43/04* (2022.01)
*H04L 9/40* (2022.01)

(52) U.S. Cl.
CPC .......... *G06F 15/173* (2013.01); *H04L 43/04* (2013.01); *H04L 63/1425* (2013.01)

(58) Field of Classification Search
CPC .... G06F 15/173; H04L 43/04; H04L 63/1408
USPC .......................................................... 709/224
See application file for complete search history.

(56) References Cited

U.S. PATENT DOCUMENTS

| | | | |
|---|---|---|---|
| 9,544,318 B2 | 1/2017 | Zafarani et al. | |
| 10,664,764 B2 | 5/2020 | Gundecha et al. | |
| 2012/0063641 A1* | 3/2012 | Venkatesh | G06K 9/00771 |
| | | | 382/103 |
| 2014/0336985 A1* | 11/2014 | Ide | G06Q 10/06 |
| | | | 702/183 |
| 2017/0212943 A1 | 7/2017 | Li et al. | |
| 2017/0213153 A1 | 7/2017 | Wang et al. | |
| 2018/0248903 A1* | 8/2018 | Villella | G06N 3/0445 |
| 2019/0379628 A1 | 12/2019 | Wu et al. | |
| 2020/0019840 A1 | 1/2020 | Guo et al. | |

FOREIGN PATENT DOCUMENTS

WO    2020061578 A1    3/2020

OTHER PUBLICATIONS

Varun Chandola, Arindam Banerjee, and Vipin Kumar. Anomaly detection: A survey. ACM CSUR, 2009 (Year: 2009).*

(Continued)

*Primary Examiner* — Suraj M Joshi
*Assistant Examiner* — Jaren Means
(74) *Attorney, Agent, or Firm* — Polsinelli PC (57) ABSTRACT

A processor is configured with a learning framework to characterize the residuals of attribute information and its coherence with network information for improved anomaly detection.

19 Claims, 3 Drawing Sheets
(2 of 3 Drawing Sheet(s) Filed in Color)

(56) References Cited

OTHER PUBLICATIONS

Sun, J. & Xie, Yinglian & Zhang, Hui & Faloutsos, Christos. (2007). Less is More: Compact Matrix Decomposition for Large Sparse Graphs, retrieved on Aug. 30, 2020 from https://www.microsoft.com/en-us/research/wp-content/uploads/2007/04/sdm07.pdf (Year: 2007).*
U.S. Appl. No. 16/525,148, filed Jul. 29, 2019, Shu et al.
U.S. Appl. No. 16/782,349, filed Feb. 5, 2020, Beigi et al.
U.S. Appl. No. 17/018,877, filed Sep. 11, 2020, Shu et al.
Charu C Aggarwal and Philip S Yu. Outlier detection for high dimensional data. 2001.
Charu C Aggarwal. Outlier analysis. In Data Mining, 2015.
Leman Akoglu, Hanghang Tong, and Danai Koutra. Graph based anomaly detection and description: A survey. DMKD, 2014.
Markus M Breunig, Hans-Peter Kriegel, Raymond T Ng, and Jorg Sander. Lof: identifying density-based local outliers. In ACM Sigmod Record, 2000.
Varun Chandola, Arindam Banerjee, and Vipin Kumar. Anomaly detection: A survey. ACM CSUR, 2009.
Chen Chen, Jingrui He, Nadya Bliss, and Hanghang Tong. On the connectivity of multi-layered networks: Models, measures and optimal control. In ICDM, 2015.
Jing Gao, Feng Liang, Wei Fan, Chi Wang, Yizhou Sun, and Jiawei Han. On community outliers and their efficient detection in information networks. In KDD, 2010.
Yuan He, Cheng Wang, and Changjun Jiang. Modeling document networks with tree-averaged copula regularization. In WSDM, 2017.
Xiao Huang, Jundong Li, and Xia Hu. Accelerated attributed network embedding. In SDM, 2017.
Xiao Huang, Jundong Li, and Xia Hu. Label informed attributed network embedding. In WSDM, 2017.
Ling Jian, Jundong Li, Kai Shu, and HuanLiu. Multi-label informed feature selection. In IJCAI, 2016.
Aleksandar Lazarevic and Vipin Kumar. Feature bagging for outlier detection. In KDD, 2005.
Jundong Li, Xia Hu, Ling Jian, and HuanLiu. Toward time-evolving feature selection on dynamic networks. In ICDM, 2016.
Jundong Li, Xia Hu, Liang Wu, and Huan Liu. Robust unsupervised feature selection on networked data. In SDM, 2016.
Jundong Li, Liang Wu, Osmar R Zaiane, and Huan Liu. Toward personalized relational learning. In SDM, 2017.
Ninghao Liu, Xiao Huang, and Xia Hu. Accelerated local anomaly detection via resolving attributed networks. In IJCAI, 2017.
Miller McPherson, Lynn Smith-Lovin, and James M Cook. Birds of a feather: Homophily in social networks. ARS, 2001.
Emmanuel Muller, Patricia Iglesias Sanchez, Yvonne Mulle, and Klemens Bohm. Rankingoutlier nodes in subspaces of attributed graphs. In ICDM Workshop, 2013.
Feiping Nie, Heng-Huang, Xiao Cai, and Chris H. Ding. Efficient and robust feature selection via joint 12, 1-norms minimization. In NIPS, 2010.
Caleb C Noble and Diane J Cook. Graph-based anomaly detection. In KDD, 2003.
Bryan Perozzi and Leman Akoglu. Scalable anomaly ranking of attributed neighborhoods. In SDM, 2016.
Bryan Perozzi, Leman Akoglu, Patricia Iglesias Sanchez, and Emmanuel Muller. Focused clustering and outlier detection in large attributed graphs. In KDD, 2014.
Doyen Sahoo, Chenghao Liu, and Stephen CH Hoi. Malicious url detection using machine learning: A survey. arXiv preprint arXiv:1701.07170, 2017.
Patricia Iglesias Sanchez, Emmanuel Muller, Fabian Laforet, Fabian Keller, and Klemens Bohm. Statistical selection of congruent subspaces for mining attributed graphs. In ICDM, 2013.
Patricia Iglesias Sanchez, Emmanuel Muller, Oretta Irmler, and Klemens Bohm. Local context selection for outlier ranking in graphs with multiple numeric node attributes. In SSDBM, 2014.
Yiyuan She and Art B Owen. Outlier detection using nonconvex penalized regression. JASA, 2011.
Jiliang Tang and Huan Liu. Coselect: Feature selection with instance selection for social media data. In SDM, 2013.
Hanghang Tong and Ching-Yung Lin. Non-negative residual matrix factorization with application to graph anomaly detection. In SDM, 2011.
Xin Wang, Steven CH Hoi, Martin Ester, Jiajun Bu, and Chun Chen. Learning personalized preference of strong and weak ties for social recommendation. In WWW, 2017.
Liang Wu, Jundong Li, Xia Hu, and Huan Liu. Gleaning wisdom from the past: Early detection of emerging rumors in social media. In SDM, 2017.
Xiaowei Xu, Nurcan Yuruk, Zhidan Feng and Thomas AJ Schweiger. Scan: a structural clustering algorithm for networks. In KDD, 2007.
Kai Yu, Jinbo Bi, and Volker Tresp. Active learning via transductive experimental design. In ICML, 2006.
Dawei Zhou, Jingrui He, K Seluk Candan, and Hasan Davulcu. Muvir: Multi-view rare category detection. In IJCAI, 2015.
Jundong Li, et al., Radar: Residual Analysis for Anomaly Detection in Attributed Networks, Proceedings of the 26th International Joint Conference on Artificial Intelligence (IJCAI), Melbourne, Australia, Aug. 19-25, 2017.

\* cited by examiner

SYSTEMS AND METHODS FOR IMPROVED ANOMALY DETECTION IN ATTRIBUTED NETWORKS

CROSS REFERENCE TO RELATED APPLICATIONS

This is a non-provisional application that claims benefit to U.S. provisional application Ser. No. 62/722,809 filed on Aug. 24, 2018, which is herein incorporated by reference in its entirety.

GOVERNMENT SUPPORT

This invention was made with government support under 1614576 awarded by the National Science Foundation. The government has certain rights in the invention.

FIELD

The present disclosure generally relates to attributed networks; and more specifically, to a processor configured with a principled learning framework to model the residuals of attribute information and its coherence with network information to accommodate improved anomaly detection of network nodes and associated devices.

BACKGROUND

Networks are widely used to represent various types of information systems. Attributed networks are pervasive in different domains, ranging from social networks, gene regulatory networks, to financial transaction networks. This kind of rich network representation presents challenges for anomaly detection due to the heterogeneity of two data representations. A vast majority of existing algorithms assume prior knowledge of certain properties of anomalies. Since various types of anomalies in real-world attributed networks exist, the assumption of prior knowledge of an anomaly does not hold in many situations.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Various embodiments for systems and methods for improved anomaly detection in attributed networks using machine learning framework to read residuals present in a network are disclosed herein. Methodologically, and taking into account such technical problems of anomaly detection, a system generally relating to a technical solution in the form a processor configured with a learning framework (referred to herein as "the present system" or "the present framework") to characterize the residuals of attribute information and its coherence with network information for anomaly detection. By learning and analyzing the residuals, anomalies may be detected whose behaviors are singularly different from the majority. Experiments on real datasets show the effectiveness and generality of the disclosed framework.

Figure 1:
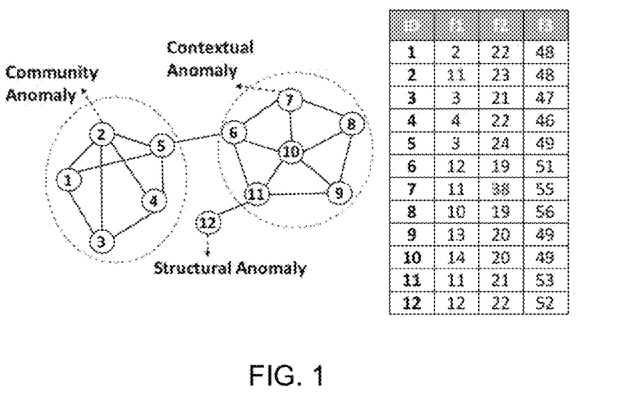
FIG. 1 is an illustration of a set of network nodes and associated attributes for illustrating possible anomalies in a specific context.

Anomaly detection (a.k.a. outlier detection) aims to discover rare instances that do not conform to the patterns of majority. Recently, there is a growing interest to perform anomaly detection in attributed networks. A straightforward way is to assume that some properties of anomalies are known in advance. For example, a vast majority of methods rely on some predefined measures to identify anomalies in a specific context, such as structural anomaly, contextual anomaly and community anomaly. FIG. 1 shows an example of these three types of anomalies using different contexts. When only considering the network information, node 12 is considered to be a structural anomaly, as it does not belong to any communities. On the other hand, if attribute information the only type of information available, node 7 is taken as a contextual anomaly since its second attribute ($f_2$) value, deviates significantly from the other nodes. Considering both network and attribute information, node 2 is anomalous. Although its attribute values on $f_1$, $f_2$ and $f_3$ are normal over the entire dataset, its attribute value on $f_1$ is relatively higher than the other nodes in the same community (node 1, 3, 4 and 5), therefore, it is referred as a community anomaly.

In many cases, the wide assumption that some properties of anomalies are known in advance might not be true. In real-world attributed networks, different types of anomalies are often mixed together and it is hard to identify all of them when there exist no prior knowledge of data. Therefore, it is beneficial and desirable to explore and spot anomalies in a general sense.

Residual analysis, which is initiated to study the residuals between true data and estimated data for regression problems, is helpful to understand anomalies in a general sense. Instances with large residual errors are more likely to be anomalies, since their behaviors do not conform to the patterns of majority reference instances. Although searching for residual errors can provide a general way to find anomalies, it is a non-trivial task in attributed networks; the reasons being: (1) there exist heterogeneous data sources in attributed networks and it is insufficient to consider residuals from just a single data source; (2) instances in attributed networks are not independent and identically distributed (i.i.d.) and the interactions among them further complicate the residual modeling process.

As a technical improvement to such aforementioned drawbacks of conventional anomaly detection, the present system is a principled system and method of identifying and detecting anomalies via residual analysis. In particular, the present system stems from the investigation of: (1) how to characterize the residuals of attribute information to spot anomalies when there is no prior knowledge of anomalies; and (2) how to exploit coherence between attribute residuals and network information to identify anomalies in a general way. Aspects of the present disclosure include:

Providing a principled learning framework to model the residuals of attribute information and its coherence with network information for anomaly detection;

Providing a novel anomaly detection framework for attributed networks by analyzing residuals found in a network; and Evaluating the effectiveness of the present system framework on real-world datasets.

Improved Anomaly Detection in Attributed Networks

Improved anomaly detection of the present system shall now be described; first, by providing some notations and formally defining the problem of anomaly detection in attributed networks. Then, a learning framework is set forth to model attribute information and network information in order to detect anomalies generally from a residual analysis perspective. In some embodiments, the learning framework may be loaded within or otherwise accessible to an application (for configuring a processor) as further described herein, the application having access to information about a plurality of network devices associated with network nodes and their attributes.

Problem Statement

Following standard notation, the following problem statement shall use bold uppercase characters for matrices (e.g., A), bold lowercase characters for vectors (e.g., b), normal lowercase characters for scalars (e.g., c), calligraphic fonts for sets (e.g., $\mathcal{F}$). Also, the convention of Matlab is followed to represent i-th row of matrix A as A(i, :), j-th column as A(:, j), (i, j)-th entry as A(i, j), transpose of A as A', trace of A as tr(A) if it is a square matrix. The $l_2$-norm of a vector $a \in \mathbb{R}^n$ is $\|a\|_2 = \sqrt{a'a}$. The $l_{2,1}$-norm a matrix $a \in \mathbb{R}^{n \times d}$ is $\|A\|_{2,1} = \sum_{i=1}^{n} \sqrt{\sum_{j=1}^{d} A(i,j)^2}$, its $l_{2,0}$-norm is the number of nonzero rows in A, and the Frobenius norm is defined as $$\|A\|_F = \sqrt{\sum_{i=1}^{n} \sum_{j=1}^{d} A(i,j)^2}.$$

In addition, let $\mathcal{U} = \{u_1, u_2, \ldots, u_n\}$ denote a set of n instances, these n instances are interconnected with each other to form a network, and the adjacency matrix $A \in \mathbb{R}^{n \times n}$ is used to represent their link relationships. Each instance is associated with a set of d-dimensional attributes (features) $\mathcal{F}\{f_1, f_2, \ldots, f_d\}$, and $X \in \mathbb{R}^{n \times d}$ is used to denote the attribute information of all n instances.

With these notations, the task of anomaly detection in attributed networks can be summarized as follows: given the attribute information X and network information A of all n instances, find a set of instances that are rare and differ singularly from the majority reference instances.

Modeling Attribute Information

Given a situation when only attribute information is available, let $\tilde{X}$ denote the estimated attribute information; using this, the approximation error $X - \tilde{X}$ (i.e., residuals) can be exploited to determine contextual anomaly as content patterns of anomalies deviate significantly from majority normal instances. One natural way to build $\tilde{X}$ is by using some representative instances. $\tilde{X}$ can be represented by W'X, where $W \in \mathbb{R}^{n \times n}$ is a coefficient matrix such that the attribute information of each instance (a row of X) can be reconstructed by a linear combination of other instances, and where W' is a matrix containing transposed W. For a certain instance, if an instance's attribute information can be approximated by some representative instances, it is less likely to be anomalous. However, if the instance cannot be well represented by some representative instances, its attribute information does not conform to the patterns of majority reference instances and is thereby more likely to be an anomaly. In other words, the attribute information of some representative instances may be used to reconstruct X. Mathematically, X is formulated as:

$$\min_{W} \|X - W'X\|_F^2 + \alpha \|W\|_{2,0}, \tag{1}$$

the row sparsity constraint $\|W\|_{2,0}$ ensures that only the attribute information of a few representative instances are employed to reconstruct X, $\alpha$ is a scalar parameter to control the row sparsity. However, the problem in Eq. (1) is NP-hard due to the $l_{2,0}$-norm term. $\|\tilde{W}\|_{2,1}$ is the minimum convex hull of $\|W\|_{2,0}$ and $\|\tilde{W}\|_{2,1}$ can be minimized to obtain the same results as $\|W\|_{2,0}$ and it is also widely used in other learning tasks such as feature selection. In this way, Eq. (1) is reformulated as:

$$\min_{W} \|X - W'X\|_F^2 + \alpha \|W\|_{2,1}. \tag{2}$$

Let $\Theta = X - W'X - R$ be a random error matrix. $\Theta$ is usually assumed to follow a multi-dimensional normal distribution. R is the residual matrix from the reconstruction process in Eq. (2). The residual matrix R can be used to determine anomalies since the attribute patterns of anomalous instances and normal instances are quite different, a large norm of R(i, :) indicates the instance has a higher probability to be an anomaly. In addition, in many applications like rumor detection, malicious URL detection and rare category detection, the number of anomalies is much smaller than the number of normal instances, therefore a $\|R\|_{2,1}$ regularization term is added on the basis of Eq. (2) to achieve row sparsity to constrain the number of abnormal instances. The objective function can be reformulated as:

$$\min_{W,R} \|X - W'X - R\|_F^2 + \alpha \|W\|_{2,1} + \beta \|R\|_{2,1}. \tag{3}$$

where $\beta$ is a scalar parameter which controls the row sparsity of residual matrix R.

Modeling Network Information

The residuals of attribute information can be modeled to spot anomalies in Eq. (3). However, in attributed networks, some types of anomalies are not solely described at a contextual level. Therefore, there is a need to exploit the correlation between attribute and network information to detect anomalies in a more general way. According to homophily theory, instances with similar patterns are more likely to be linked together in attributed networks. Similarly, when X is reconstructed by the attribute information of some representative instances, the homophily effect should also hold. It indicates that if two instances are linked together in the network, after attribute reconstruction by representative (normal) instances, their attribute patterns in the residual matrix R should also be similar. If the attributed network is an undirected network, it can be mathematically formulated by minimizing the following term:

$$\frac{1}{2} \sum_{i=1}^{n} \sum_{j=1}^{n} (R(i, :) - R(j, :))^2 A(i, j) = tr(R'(D-A)R) = tr(R'LR), \tag{4}$$

where D is a diagonal matrix with $D(i, i)=\Sigma_{j=1}^{n}A(i, j)$, L is a Laplacian matrix. If the attributed network is a directed network, the graph regularization term in Eq. (4) cannot be used directly since the adjacency matrix A is not symmetric. To model the network information on directed networks, $A=\max(A, A')$ is used. Then, the Laplacian matrix is in the same form as the undirected networks.

Anomaly Detection Framework

The objective function in Eq. (3) is based on a strong assumption that instances are independent and identically distributed (i.i.d.). However, it is not the case in networks where instances are interconnected with each other, the interactions among instances also complicate the residual modeling process. Therefore, the present system includes the proposal to integrate the network modeling term in Eq. (4) on the basis of Eq. (3) to capture the coherence between attribute residual information and network information, the objective function of the disclosed framework can be formulated as follows:

$$\min_{W,R}\|X - W'X - R\|_F^2 + \alpha\|W\|_{2,1} + \beta\|R\|_{2,1} + \gamma tr(R'LR). \quad (5)$$

where $\gamma$ is a scalar parameter to balance the contribution of attribute reconstruction and network modeling.

It can be observed that without any prior knowledge about anomalies, a general learning framework (Eq. (5)) is built to detect anomalous instances generally by exploiting both attribute information and network information as well as their correlations. By learning and analyzing the residual matrix R, it enables the ranking of anomalies according to their residual values. Different from making a binary decision of anomalies, anomaly ranking is easier to be interpreted. It makes further exploration possible as decision markers can check the degrees of deviation manually.

Optimization Algorithm

In some embodiments, an optimization algorithm may be implemented for the disclosed framework. This section includes a convergence analysis and a time complexity analysis of the disclosed optimization process.

The objective function in Eq. (5) is not convex in terms of both W and R simultaneously. Besides, it is also not smooth due the existence of $l_{2,1}$-norm regularization term. An alternating way to optimize this problem may be implemented.

Update R:

When W is fixed, Eq. (5) is convex w.r.t. R. Therefore, W is first fixed to update R, and the terms that are irrelevant to R are removed, then the objective function in Eq. (5) can be reformulated as:

$$\min_{R}\mathcal{J}(R) = \|X - W'X - R\|_F^2 + \beta\|R\|_{2,1} + \gamma tr(R'LR). \quad (6)$$

The derivative of $\mathcal{J}(R)$ is taken w.r.t. R and set to zero, then:

$$W'X-X+R+\beta D_R R+\gamma LR=0, \quad (7)$$

where $D_R$ is a diagonal matrix with the i-th diagonal element as $$D_R(i, i) = \frac{1}{2\|R(i, :)\|_2}1.$$

The Laplacian matrix L is a positive semidefinite matrix; I and $\beta D_R$ are two diagonal matrices with positive diagonal entries, they are both positive semidefinite. Therefore, the summation of three positive semidefinite matrices $I+\beta D_R+\gamma L$ is also a positive semidefinite matrix. Hence, R has a closed form solution:

$$R=(I+\beta D_R+\gamma L)^{-1}(X-W'X) \quad (8)$$

[1] In practice, $\|R(i, :)\|_2$ and $\|W(i, :)\|_2$ could be very close to zero but not zero. However, either could be zero theoretically. Therefore it can be defined, $$D_R(i, i) = \frac{1}{2\|W(i, :)\|_2 + \epsilon}, D_R(i, i) = \frac{1}{2\|W(i, :)\|_2 + \epsilon},$$

respectively, where $\epsilon$ is a very small constant.

Update W:

When R is fixed, Eq. (5) is convex w.r.t. W. Next, R is fixed to update W. The terms that are irrelevant to W are removed such that the objective function in Eq. (5) is formulated as:

$$\min_{W}\mathcal{J}(W) = \|X - W'X - R\|_F^2 + \alpha\|W\|_{2,1}. \quad (9)$$

Similarly, the derivative of $\mathcal{J}(W)$ is set w.r.t. W to zero and thus:

$$(XX'+\alpha D_W)W=XX'-XR', \quad (10)$$

where $D_W$ is a diagonal matrix with the i-th diagonal element as $$D_W(i, i) = \frac{1}{2\|W(i, :)\|_2}.$$

$XX'$ is a positive semidefinite matrix, $\alpha D_W$ is a diagonal matrix with positive entries, it is also positive semidefinite. Their summation $XX'+\alpha D_W$ is also positive semidefinite. W has a closed form solution, which is:

$$W=(XX'+\alpha D_W)^{-1}(XX'-XR'). \quad (11)$$

Based on Eq. (8) and Eq. (11), the present system that detects anomalies in attributed networks via residual analysis is presented in Algorithm 1. $D_R$, $D_W$ are first initialized to be identity matrices and R is initialized to be $(I+\beta D_R+\gamma L)^{-1}X$ (line 2-3). Then R is fixed to update W (line 5) and W is fixed to update R (line 7) iteratively until the objective function in Eq. (5) converges. After the iteration terminates, the anomaly score for each instance is computed according to its norm in the residual matrix R, i.e., $\|R(i, :)\|_2$ (line 10). Instances with large anomaly scores are more likely to be abnormal. These instances are then sorted by their anomaly scores in a descending order and return the top m ranked instances which are considered to be the most abnormal instances (line 11).

Algorithm 1: Anomaly detection in attributed networks via residual analysis
Input: Attribute matrix X, adjacency matrix A, parameters $\alpha$, $\beta$, $\gamma$.
Output: Top m instances with the highest anomaly scores.
1:   Build Laplacian matrix L from the adjacency matrix A;
2:   Initialize $D_R$ and $D_W$ to be identity matrix;
3:   Initialize $R = (I + \beta D_R + \gamma L)^{-1}X$;
4:   while objective function in Eq. (5) not converge do 5:   Update W by Eq. (11);

6:   Update $D_W$ by setting $D_W(i, i) = \frac{1}{2\|W(i, :)\|_2}$;

7:   Update R by Eq. (8);

8:   Update $D_R$ by setting $D_R(i, i) = \frac{1}{2\|R(i, :)\|_2}$;

9:   end while
10:  Calculate the anomaly score for the i-th instance as $\|R(i, :)\|_2$; and
11:  Return top m instances with the highest anomaly score.

Convergence Analysis

We show the alternating way to update R and W in Algorithm 1 decreases the objective function value in Eq. (5) each iteration monotonically and the objective function value is guaranteed to converge. In practice, experimental results showed that the iteration process usually converges within 50 iterations for all datasets described herein.

Lemma 1. The following inequality holds if $W_t(i, :)$ and $W_{t+1}(i, :)$ are nonzero vectors:

$$\|W_{t+1}\|_{2,1} - \sum_i \frac{\|W_{t+1}(i, :)\|_2^2}{2\|W_t(i, :)\|_2} \leq \|W_t\|_{2,1} - \sum_i \frac{\|W_t(i, :)\|_2^2}{2\|W_t(i, :)\|_2}, \quad (12)$$

where $W_t$ denotes the update of W at the t-th iteration.

Theorem 1. The alternating procedure to update W and R iteratively will monotonically decrease the objective function value of Eq. (5) at each iteration.

Proof.

When $R_t$ is fixed, update $W_{t+1}$ according to Eq. (11), $W_{t+1}$ is the solution of the following objective function:

$$\min_W \|X - W'X - R\|_F^2 + \alpha\|W\|_{2,1}. \quad (13)$$

Therefore, the following inequality holds:

$$\|X - W_{t+1}'X - R_t\|_F^2 + \alpha tr(W_{t+1}D_W W_{t+1}) \leq \|X - W_t'X - R_t\|_F^2 + \alpha tr(W_t D_W W_t). \quad (14)$$

It is also equivalent to:

$$\|X - W_{t+1}'X - R_t\|_F^2 + \alpha\|W_{t+1}\|_{2,1} - \alpha\left(\|W_{t+1}\|_{2,1} - \sum_i \frac{\|W_{t+1}(i, :)\|_2^2}{2\|W_t(i, :)\|_2}\right) \leq \quad (15)$$

$$\|X - W_t'X - R_t\|_F^2 + \alpha\|W_t\|_{2,1} - \alpha\left(\|W_t\|_{2,1} - \sum_i \frac{\|W_t(i, :)\|_2^2}{2\|W_t(i, :)\|_2}\right).$$

Integrating the inequality condition in Lemma 1, thus:

$$\|X - W_{t+1}'X - R_t\|_F^2 + \alpha\|W_{t+1}\|_{2,1} \leq \|X - W_t'X - R_t\|_F^2 + \alpha\|W_t\|_{2,1} \Rightarrow \mathcal{J}(W_{t+1}, R_t) \leq \mathcal{J}(W_t, R_t). \quad (16)$$

Similarly, it can be proven that $\mathcal{J}(W_{t+1}, R_{t+1}) \leq \mathcal{J}(W_{t+1}, R_t)$. Therefore, $\mathcal{J}(W_{t+1}, R_{t+1}) \leq \mathcal{J}(W_{t+1}, R_t) \leq \mathcal{J}(W_t, R_t)$, indicating the alternating update rule in Algorithm 1 decreases the objective function at each iteration and it finally converges.

Time Complexity Analysis

At each iteration, R and W are updated iteratively, the most cost operation are the matrix inverse operations $(I+\beta D_R+\gamma L)^{-1}$ and $(XX'+\alpha D_W)^{-1}$ which both require $O(n^3)$. However, the update of R can be sped up by solving the following linear equation system: $(I+\beta D_R+\gamma L)R=X-W'X$, which only needs $O(n^2 d)$ (d is usually smaller than n). Therefore, the total time complexity is #iterations*$(O(n^2 d)+O(n^3))$.

Experiments

In this section, experiments are conducted to evaluate the effectiveness of the disclosed system. In particular, the following two questions are investigated: (1) How is the anomaly detection performance of the disclosed system when measured against other representative anomaly detection methods? (2) Does the utilization of coherence between attribute residuals and network information help find anomalous instances otherwise remain undiscovered? Before discussing about details of the experiments, the datasets and the experimental settings will first be introduced.

Datasets

Three real-world attributed network datasets were used for the evaluation of the disclosed anomaly detection method. Among them, Disney dataset and Books dataset come from Amazon co-purchase networks. Disney is a co-purchase network of movies, the attributes include prices, ratings, number of reviews, etc. The ground truth (anomalies) are manually labeled by high school students. The second dataset, Books, is a co-purchase network of books, it has similar attributes as Disney dataset. The ground truth (anomalies) are obtained by amazonfail tag information. Enron is an email network dataset, spam messages are taken as ground truth. The statistics of these datasets are listed in Table 1.

TABLE 1

Detailed information of the datasets.

|                   | Disney | Books | Enron   |
|-------------------|--------|-------|---------|
| # of Nodes        | 124    | 1,418 | 13,533  |
| # of Edges        | 334    | 3,695 | 176,987 |
| # of Attributes   | 28     | 28    | 20      |
| ratio of anomalies| 0.048  | 0.020 | 0.004   |

Experimental Settings

The criteria of AUC (Area Under ROC Curve) is applied to evaluate the performance of anomaly detection algorithms. According to the ground truth and the results by anomaly detection algorithms, there are four possible outcomes: anomaly is recognized as anomaly (TP), anomaly is recognized as normal (FN), normal is recognized as anomaly (FP), and normal is recognized as normal (TN). Therefore, the detection rate (dr) and false alarm rate (flr) are defined as $$dr = \frac{TP}{TP + FN}, \quad flr = \frac{FP}{FP + TN}.$$

Then the ROC curve is a plot of detection rate (dr) vs. false alarm rate (flr). From the statistical perspective, AUC value represents the probability that a randomly chosen abnormal instance is ranked higher than a normal instance. If the AUC value approaches 1, the method is of high quality.

The disclosed framework was compared with four baseline methods which perform anomaly detection when some characteristics of anomalies are known in advance:

LOF [Breunig et al., 2000]: LOF detects anomalies in a contextual level and only uses attribute information.

SCAN [Xu et al., 2007]: SCAN detects anomalies in a structural level and only considers network information.

CODA [Gao et al., 2010]: CODA detects anomalies within the context of communities where these instances deviate significantly from other community members.

ConSub+CODA [Sanchez et al., 2013]: It performs subspace selection as a pre-processing step and then applies CODA to detect subspace community anomalies.

Among them, LOF, SCAN, CODA covers three types of widely defined anomalies in attributed networks (contextual anomaly, structural anomaly and community anomaly). Consub+CODA is able to find subspace community anomalies by taking subspace selection as a pre-processing step. The parameter settings of these baseline methods follow the settings of [Sanchez et al., 2013]. The disclosed framework has three different regularization parameters, for a fair comparison, these parameters are tuned by a "grid-search" strategy from $\{10^{-3}, 10^{-2}, \ldots, 10^2, 10^3\}$.

Performance Comparison

Figure 2:
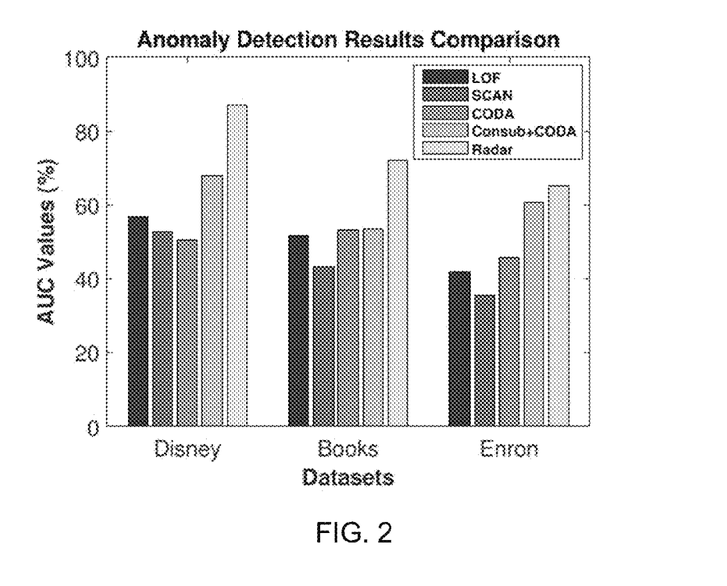
FIG. 2 is a bar graph illustrating anomaly detection results by different possible non-limiting methods.

The experimental results in terms of AUC values are presented in FIG. 2. By comparing the performance of different methods, it can be observed that the disclosed framework always or generally obtains the best anomaly detection performance. The reason is that in real-world attributed networks, nodes are annotated as anomalies due to a variety of reasons. The disclosed algorithm provides a general way to detect anomalies globally and does not depend on specific properties of anomalies. A one tailed t-test was also performed between the present system and other baseline methods and the test results show that the present system performs significantly better (with a 0.05 significance level). Therefore, the disclosed framework outperforms other representative anomaly detection algorithms for attributed networks.

Coherence Between Attribute Residuals and Network Information

In this subsection, the second question is studied to investigate how the coherence between attribute residuals and network information affects anomaly detection results. Comparing the inventive concept of the present system with the following methods by varying $\gamma$:

Residual-based method: The parameter $\gamma$ is set to be zero, therefore, only residuals of attribute information is taken into consideration. The detected anomalies can be considered as contextual anomalies.

Network-based method: The parameter $\gamma$ is set to be a large number, therefore, the contribution from attribute residuals can be ignored. The detected anomalies can be considered as structural anomalies.

Figure 3:
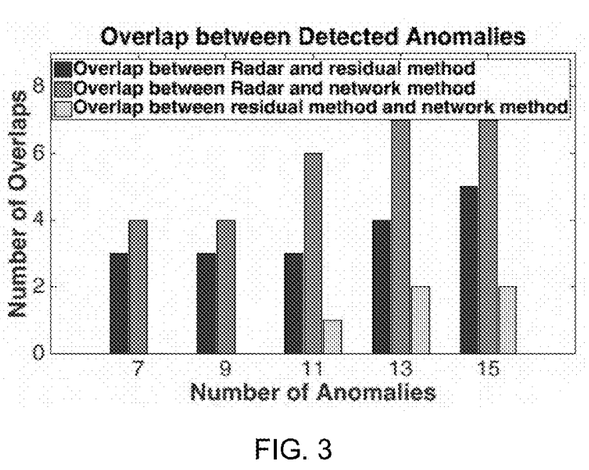
FIG. 3 is a bar graph illustrating anomalies overlap comparison as described herein.

First, compare the anomaly detection results by the disclosed system, the residual-based method and the network-based method on a Disney dataset, the AUC values are 87.1%, 77.68%, 74.29%, respectively. It indicates that by exploiting the correlation between attribute residuals and network information, the anomaly detection performance indeed improves. The comparison results are only presented on the Disney dataset as similar observations exist on the other two datasets. Second, the overlap of detected anomalies is compared by each pair of method (the present system and a residual-based method, the present system and a network-based method, residual-based method and network-based method) in FIG. 3. As can be observed, when the number of detected anomalies is varied, the overlap of anomalies between the present system and residual-based method, the present system and network-based method are always larger than the overlap between residual-based method and network-based method. This phenomenon shows that by exploiting the correlation between attribute residuals and network structure, otherwise undiscovered anomalies can be found using a single source of information. It also shows the potential to detect anomalies generally via residual analysis.

Effects of Parameters

Figure 4:
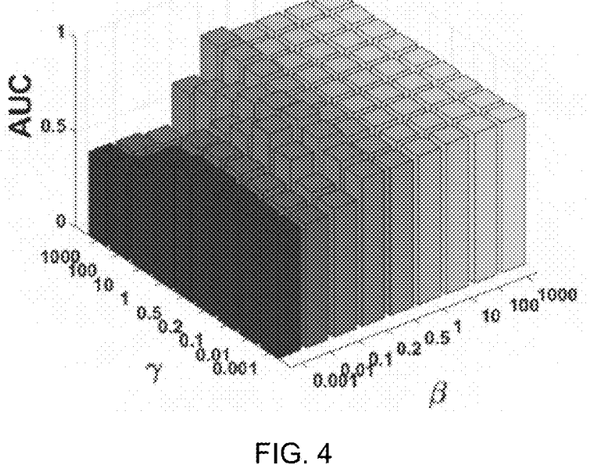
FIG. 4 is a graph illustrating performance variance results and effects of parameters as described herein.

In some embodiments, there are three parameters in the disclosed framework. Among them, $\beta$ and $\gamma$ are relatively more important. The parameter $\beta$ controls the number of anomalies, while $\gamma$ balances the contribution of attribute information and network information for anomaly detection. Due to space limit, only how these two parameters affect the anomaly detection results on Disney dataset is investigated. The performance variance result is shown in FIG. 4 ($\alpha$ is fixed to be 0.5). It is observed that when $\beta$ is small, the AUC values are relatively low, the anomaly detection performance is not sensitive to the parameters when $\beta$ and $\gamma$ are in the range of 0.1 to 1000, and 0.001 to 10, respectively. The anomaly detection performance is the best when both $\beta$ and $\gamma$ are around 0.2.

Computing System

Figure 5:
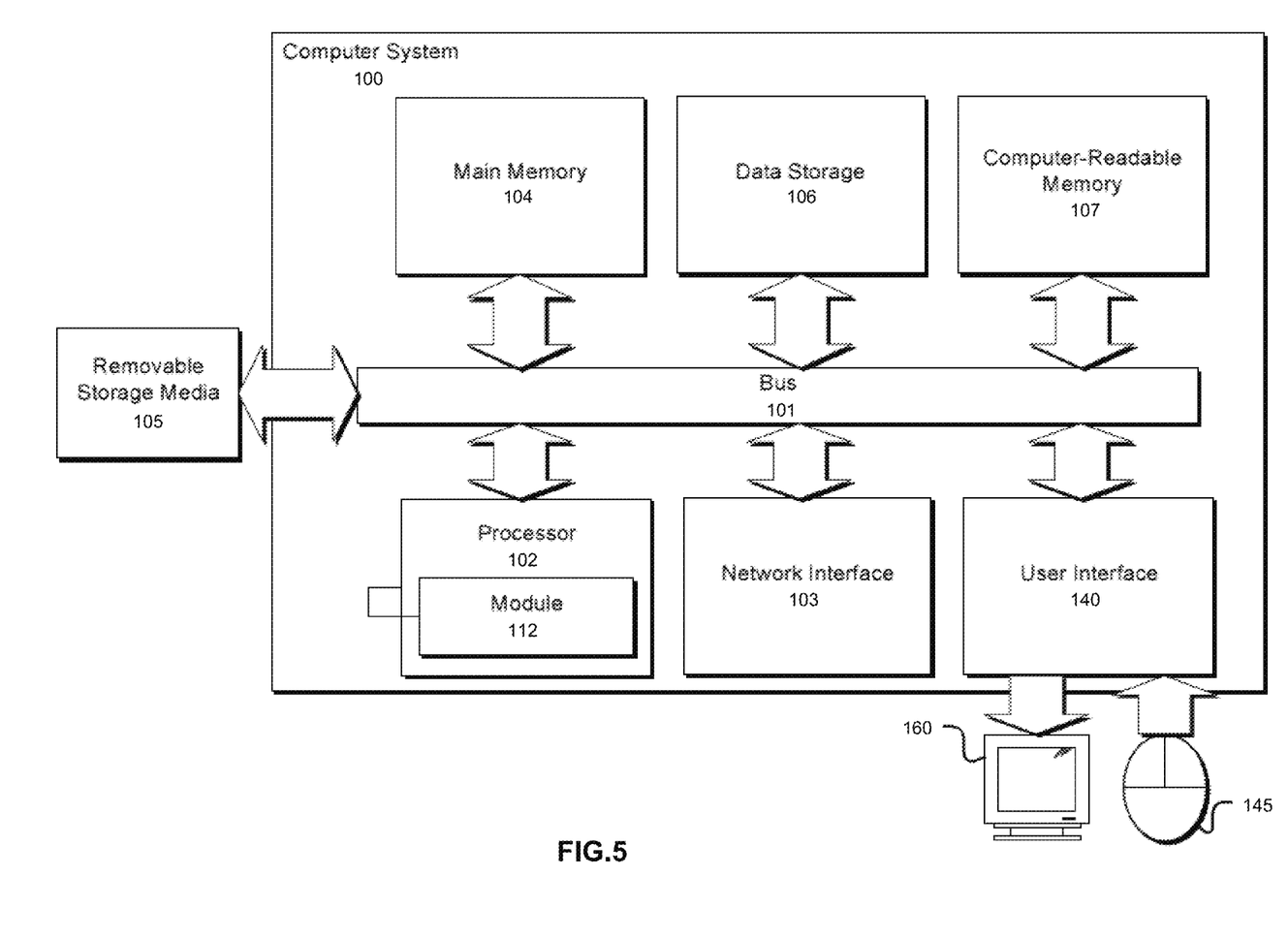
FIG. 5 is a simplified block diagram illustrating an exemplary network system for anomaly detection.

Referring to FIG. 5, an exemplary network system 100 for implementing functionality associated with anomaly detection is shown. The network system 100 may include and/or generally support functionality defined by an application 102, configured to provide functionality associated with anomaly detection, among other features as described herein. The application 102 may be hosted on one or more of a computing device 104, which may include a server, controller, a personal computer, a terminal, a workstation, a portable computer, a mobile device, a tablet, a mainframe, or other such computing device. The computing device 104 is configured for administering and providing access to aspects of the application 102 via a network 106, which may include the Internet, an intranet, a virtual private network (VPN), and the like. In some embodiments, a cloud (not shown) may be implemented to execute one or more components of the network system 100. In addition, aspects of the network system 100 and/or the application 102 may be provided using platform as a service (PaaS), and/or software as a service (SaaS) using e.g., Amazon Web Services, or other distributed systems.

As further indicated, the application 102 may have access to a database 112. The database 112 may store data associated with network nodes. For example, in some embodiments, the database 112 may include information about detected anomalies, attributes of network nodes, and the like. In some embodiments, as shown, information from the database 112 may be accessible to the application 102 via one or more of an application programming interface (API) 114.

At least some features of the application 102 may be made available to one or more network nodes 120 via the network 106. The network nodes 120 may be associated with or otherwise include without limitation, at least one of a device such as a controller, a personal computer, a terminal, a workstation, a portable computer, a mobile device, a tablet, a phone, a pager, and a multimedia console.

A computing device that may implement various methodologies discussed herein. For example, the computing device may be implemented similar to the computing device 104 and configured to host and manage aspects of the application 102. The computing device includes a bus (i.e., interconnect), at least one processor or other computing element, at least one communication port, a main memory, a removable storage media, a read-only memory, and a mass storage device. Processor(s) can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) may be chosen depending on a network such as a Local Area Network (LAN), a Wide Area Network (WAN), or any network to which the computer device connects. Computing device may further include a transport and/or transit network 755, a display screen, an I/O port, and an input device such as a mouse or keyboard.

Main memory can be Random Access Memory (RAM) or any other dynamic storage device(s) commonly known in the art. Read-only memory 706 can be any static storage device(s) such as Programmable Read-Only Memory (PROM) chips for storing static information such as instructions for processor. Mass storage device can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus communicatively couples processor(s) with the other memory, storage, and communications blocks. Bus can be a PCI/PCI-X, SCSI, or Universal Serial Bus (USB) based system bus (or other) depending on the storage devices used. Removable storage media can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory may be encoded with the application that supports functionality discussed above. In other words, aspects of the application (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) accesses main memory via the use of bus in order to launch, run, execute, interpret, or otherwise perform processes, such as through logic instructions, executing on the processor and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

SUMMARY

As described herein, a novel anomaly detection framework is discussed for attributed networks. Methodologically, the learning framework characterizes attribute reconstruction residuals and its correlation with network information to detect anomalies. Through learning and probing the residuals of the reconstruction process, the framework accommodates the detection of anomalies in a global view when properties of anomalies are unknown. Experiments on real-world datasets show that the subject framework yields better AUC values compared to baseline methods which define anomalies in a specific context. Besides, the coherence between attribute residuals and network structure can help uncover anomalies otherwise undiscovered by a single source of information.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for characterizing and detecting anomalies in an attributed network, the system comprising:
   a plurality of network devices associated with nodes of an attributed network;
   a dataset including a plurality of instances related to data derived from one or more nodes of the attributed network, the dataset defining a set of attributes and a set of adjacency information for the plurality of instances in the attributed network; and
   a processor accessing the dataset and configured to perform operations that:
      access the set of attributes and the set of adjacency information;
      initialize a residual matrix R, wherein the residual matrix R is representative of residuals inherent to the set of attributes;
      update the residual matrix R by iteratively solving an objective function, wherein the objective function comprises the residual matrix R;
      use the updated residual matrix R to rank a set of possible anomalies by assigning an anomaly score to each of the plurality of instances, wherein the anomaly score corresponds to a degree of abnormality of the plurality of instances; and
      detect a subset of anomalous instances from the plurality of instances, wherein the subset of anomalous instances is associated with the highest degree of abnormality in the attributed network, and is based on instances ranked highest according to their assigned anomaly score, wherein the subset of anomalous instances are rare and differ singularly from the majority reference instances of the plurality of instances, and wherein the objective function includes a scalar parameter to balance contribution of reconstruction of the set of attributes and network modeling.

2. The system of claim 1, wherein the set of attributes is representative of features or attributes of a network for the plurality of instances and wherein the set of adjacency information comprises link relationships for the plurality of instances throughout the network.

3. The system of claim 1, wherein the residual matrix R is built from a set of approximation error values, wherein the approximation error values are obtained using the set of attributes and a coefficient matrix W.

4. The system of claim 3, wherein the processor is further configured to execute operations that:
   update the coefficient matrix W and the residual matrix R in an alternating fashion until the objective function converges, wherein the residual matrix R is held constant as the coefficient matrix W is updated and wherein the coefficient matrix W is held constant as the residual matrix R is updated.

5. The system of claim 1, wherein a plurality of scalar parameters are used to control row sparsity or contribution of the set of attributes or the set of adjacency information.

6. The system of claim 1, wherein the set of possible anomalies is ranked in descending order and wherein the top m instances are returned.

7. A method for detecting anomalies in an attributed network, the method comprising:

accessing, as an input, information associated with one or more network nodes and corresponding devices of a network;

generating, based on the information, an attribute matrix X, an adjacency matrix A, and a plurality of parameters, wherein the attribute matrix X and the adjacency matrix A contain information about a plurality of instances;

building a Laplacian matrix L from the adjacency matrix A;

initializing $D_R$ and $D_W$ to be identity matrices, wherein $D_R$ is a diagonal matrix which corresponds to a residual matrix R and wherein $D_W$ is a diagonal matrix which corresponds to a coefficient matrix W;

initializing the residual matrix R;

converging an objective function by iteratively updating the coefficient matrix W, the diagonal matrix $D_W$, the residual matrix R, and the diagonal matrix $D_R$ until the objective function converges;

calculating an anomaly score for each of the plurality of instances based on a set of values from the residual matrix R;

ranking the plurality of instances according to their respective anomaly score, wherein a higher rank represents a higher degree of abnormality of a particular instance, wherein the anomaly score for each of the plurality of instances is calculated by computing the norm for each instance in the residual matrix R; and detecting a subset of anomalous instances based on the highest ranked instances of the plurality of instances.

8. The method of claim 7, wherein the plurality of parameters include:

parameter β, wherein parameter β is used to control row sparsity of the residual matrix R;

parameter γ, wherein parameter γ is used to balance contribution of attribute information and network information within the objective function and the residual matrix R; and parameter α, wherein parameter a is used to control row sparsity of the coefficient matrix W;

wherein parameter β, parameter γ, and parameter α are scalar quantities.

9. The method of claim 8, wherein the residual matrix R is initialized by multiplying the inverse of the summation of an identity matrix I, the diagonal matrix $D_R$, and the Laplacian matrix L with the set of approximation error values in matrix form, wherein the diagonal matrix $D_R$ is multiplied with the parameter β and the Laplacian matrix L is multiplied with the parameter γ.

10. The method of claim 7, wherein the residual matrix R is built from a set of approximation error values, wherein the approximation error values are obtained using the attribute matrix X and the coefficient matrix W.

11. The method of claim 7, wherein each individual row of the attribute matrix X corresponds to an individual instance of the plurality of instances.

12. The method of claim 11, wherein the coefficient matrix W is built such that the attribute information contained in the attribute matrix X for each individual instance can be reconstructed by a linear combination of other instances contained in the attribute matrix X.

13. The method of claim 7, wherein the coefficient matrix W is updated by fixing the residual matrix R to remain constant and solving for the coefficient matrix W using the objective function.

14. The method of claim 13, further comprising:

reducing the objective function to contain terms which are relevant to the coefficient matrix W;

setting a derivative of the reduced objective function to be zero and obtaining a closed-form solution for the coefficient matrix W;

wherein the closed-form solution for the coefficient matrix W contains the diagonal matrix $D_W$.

15. The method of claim 14, wherein an i-th diagonal element of the diagonal matrix $D_W$ comprises $$D_W(i, i) = \frac{1}{2\|W(i, :)\|_2}.$$

16. The method of claim 7, wherein the residual matrix R is updated by fixing the coefficient matrix W to remain constant and solving for the residual matrix R using the objective function.

17. The method of claim 16, further comprising:

reducing the objective function to contain terms which are relevant to the residual matrix R;

setting a derivative of the reduced objective function to be zero and obtaining a closed-form solution for the residual matrix R;

wherein the closed-form solution for the residual matrix R contains the diagonal matrix $D_R$.

18. The method of claim 17, wherein an i-th diagonal element of the diagonal matrix $D_R$ comprises $$D_R(i, i) = \frac{1}{2\|W(i, :)\|_2}.$$

19. The method of claim 7, further comprising:

ranking each instance in descending order by anomaly score and returning the top m ranked instances, wherein a higher anomaly score indicates a higher probability that the instance is anomalous.

* * * * *